United States Patent [19]

Hayashi

[11] Patent Number: 4,718,659
[45] Date of Patent: Jan. 12, 1988

[54] SHEET WINDING APPARATUS

[75] Inventor: Toshihiro Hayashi, Tokyo, Japan

[73] Assignee: Minolta Camera Kabushiki Kaisha, Osaka, Japan

[21] Appl. No.: 829,093

[22] Filed: Feb. 12, 1986

[30] Foreign Application Priority Data

Feb. 13, 1985 [JP] Japan ................ SHO 60-27213

[51] Int. Cl.[4] ............................................ B65H 7/06
[52] U.S. Cl. .................................. 271/259; 271/277
[58] Field of Search .............. 271/258, 259, 265, 277

[56] References Cited

U.S. PATENT DOCUMENTS

| | | | |
|---|---|---|---|
| 1,480,132 | 1/1924 | White | 271/259 |
| 3,006,450 | 10/1961 | Nash | 271/259 X |
| 3,460,827 | 8/1969 | Shaw | 271/259 |
| 3,884,461 | 5/1975 | Hauser | 271/277 |
| 4,259,695 | 3/1981 | Nakano | 271/277 X |
| 4,390,176 | 6/1983 | Kato | 271/277 X |

FOREIGN PATENT DOCUMENTS 56-4013 1/1981 Japan.

Primary Examiner—Richard A. Schacher
Attorney, Agent, or Firm—Wenderoth, Lind & Ponack

[57] ABSTRACT

A sheet winding apparatus with a detection mechanism for detecting incorrect winding of a sheet and stopping the movement of the apparatus. The detection mechanism includes an actuator member movably provided on a front cover of the apparatus so as to detect incorrect winding of a sheet as well as to detect opening of the front cover.

3 Claims, 11 Drawing Figures

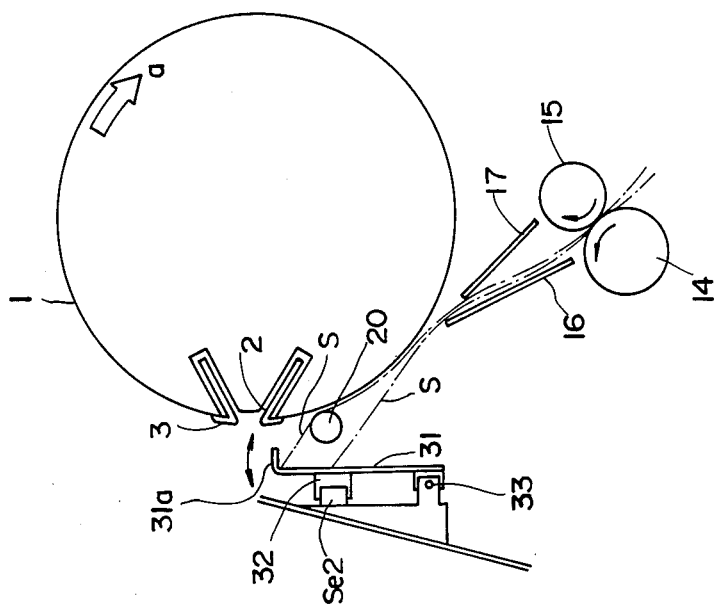
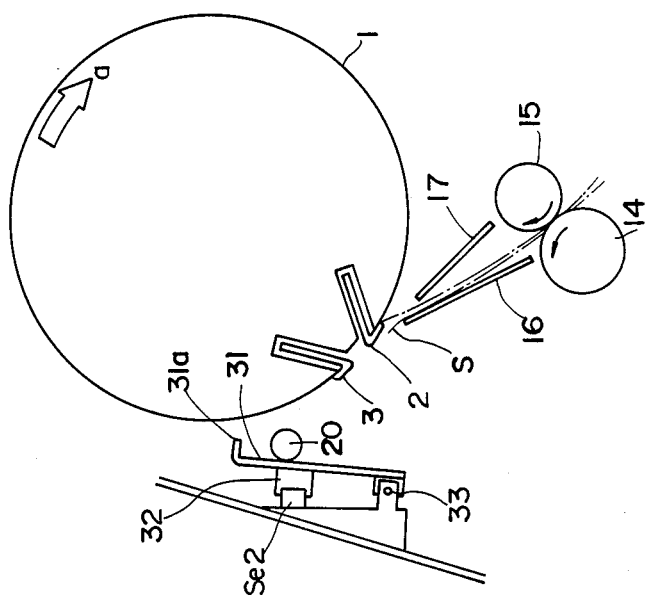

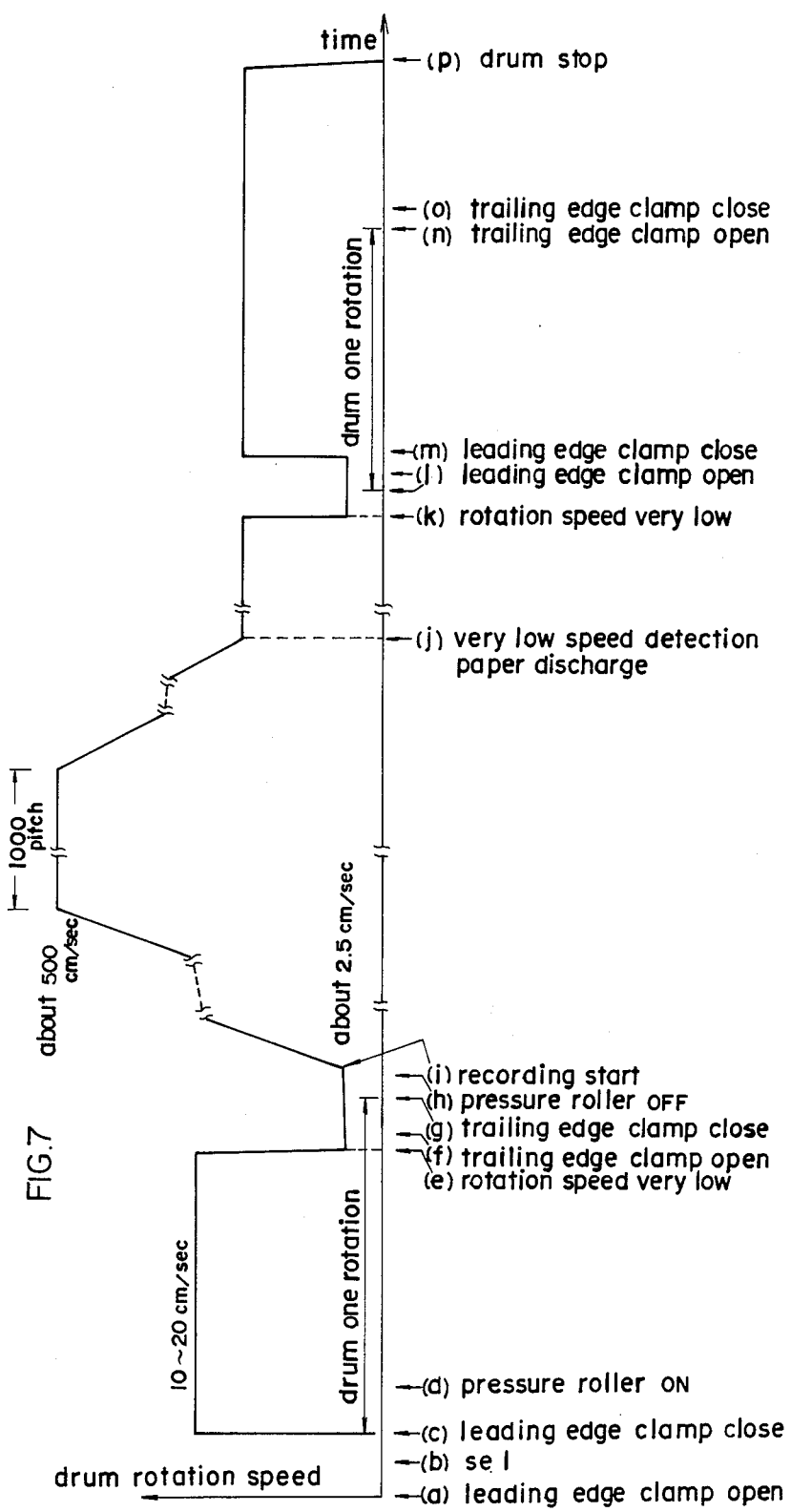

SHEET WINDING APPARATUS

FIELD OF THE INVENTION

This invention concerns a device to detect winding faults in sheet winders of ink jet printers or the like, wherein sheets of text or record paper are wound around a drum that can be rotated.

DESCRIPTION OF THE PRIOR ART

Various kinds of systems have been devised or proposed in the past as sheet winders. In most of these devices, the front edge or rear edge of the paper is held against the surface of the drum by means of a clamp parallel to the drum axis. When a sheet of paper is fed to the drum from one direction, the front edge is clamped to the drum which is rotated so as to wind the paper therearound, and then the rear edge of the paper is clamped to the drum.

In such a device, however, when curled sheets are fed or when two or more sheets are fed together (referred to hereafter as overfeed), the device may fail to clamp the front edge, which leads to paper jamming which in turn causes damage to peripheral parts around the drum or a recording head.

Conventional devices have detectors in order to stop the rotation of the drum or the like immediately if the front edge of the paper is not properly clamped. Such a device, for example, has a wire stretched parallel to the drum surface, a plate with a slit provided at the other end of the wire and a transmission photosensor installed on the other side of the plate. This device detects the clamping failure in such a manner that when a sheet that has not been correctly clamped touches the wire, the slit plate oscillates to cause the photosensor to switch ON and OFF (Japanese Patent Laid-Open No. 56-4013).

However, because the detector in such a device includes the wire stretched parallel to the drum, it is difficult to detect a sheet which is carried forward but with the front edge not properly clamped.

SUMMARY OF THE INVENTION

The main object of this invention is to provide a sheet winding apparatus with a detection mechanism that can detect incorrect winding of a sheet whenever the sheet is not properly clamped.

Another object of the invention is to provide a sheet winding apparatus with a detection mechanism that can detect incorrect winding of a sheet whenever the front edge of the sheet is not properly clamped.

Another object of the invention is to provide a sheet winding apparatus with a detection mechanism that can detect incorrect winding of a sheet whenever the rear edge of the sheet is not properly clamped.

In order to achieve the above objectives, the faulty winding detection device of this invention comprises a sheet detector which pivots freely when an advancing sheet fails to properly be held by the clamp, and a switch mechanism which detects the pivoting action of the sheet detector.

These and other objects, advantages and features of the invention will become apparent from the following description thereof taken in conjunction with the accompanying drawings which illustrate specific embodiments of the invention.

BRIEF DESCRIPTION OF THE DRAWINGS

FIGS. 3-6 show the sequences of detecting the faulty winding of an advancing sheet;

FIG. 7 is a time chart of the winding action of the sheet around the drum.

DETAILED DESCRIPTION OF THE PREFERRED EMBODIMENTS

Figure 1:
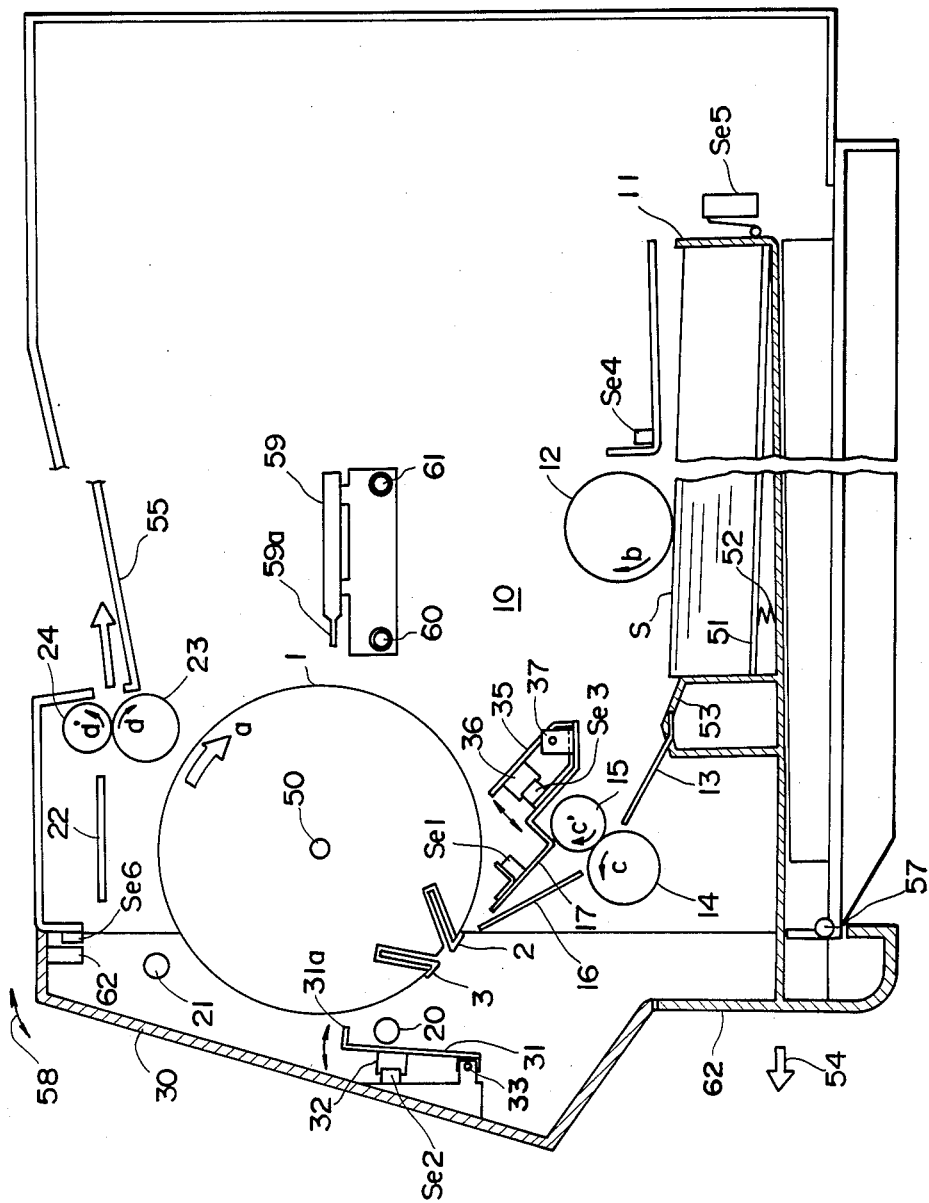
FIG. 1 is a sectional view showing the main structure of an ink jet printer incorporating the sheet winding apparatus of this invention.

FIG. 1 shows a main structure of the ink jet printer. (1) is a drum mounted in a housing for supporting a sheet on the surface thereof, which can be driven at a variable speed around an axis of rotation (50) in the direction (a). The drum (1) has a front clamp (2) to hold the front edge of the sheet, and a rear clamp (3) to hold the rear edge of the sheet. These front and rear clamps, (2) and (3), are provided so as to engage with or disengage from the drum surface by means of first and second solenoids which are not shown.

A paper feeding section (10) comprises a cassette (11) accomodating record papers (S), a paper feed roller (12) which is rotatable in direction (b) in order to feed the record paper (S) one sheet at a time, a guide plate (13), carrier rollers (14), (15) rotatable in directions (c) and (c'), and guide plates (16) and (17). A reflecting photosensor (Se 1) is provided on the guide plate (17) in order to detect the arrival of the front edge of paper (S).

The above paper feed cassette (11) itself constitutes a unit (62) detachable from the body proper and comprising a base plate (51) which supports the paper, a biasing spring (52) that urges the base plate (51) towards the paper feed roller (12), and a front edge guide (53) which guides the sheet of paper from the paper feed roller (12) to the guide plate (13). Further, the paper feed cassette is withdrawable from the main body in the direction shown by arrow 54, by means of a guide mechanism which is not shown.

An ink jet printing head (59) is disposed in the upper part of the paper feeding section (10). This printing head (59) is movable across the width of the drum (1), by means of guide axes (60), (61) which are parallel to the axis of rotation of the drum (50). And the printing head (59) is moved across the width of the drum (1) by a pulse motor as and ink is ejected onto the sheet supported on the drum (1).

In the vicinity of the drum (1), a pressure roller (20) is provided which aids the drum (1) to wind the sheet therearound without wrinkling, and also a separating roller (21) which separates the sheet from the drum surface. These rollers (20) and (21) are provided for engagement and disengagement with the drum by means of third and fourth solenoids (not shown). In addition, directly above the drum (1), a paper ejector guide plate (22), and, paper discharging rollers (23), (24) are provided wherein rollers (23) and (24) are rotatable in the directions (d) and (d').

In the upper part of the unit, a paper discharging tray (55) is provided on an outer frame to receive the sheets discharged from the paper discharging rollers (23), (24).

Figure 2:
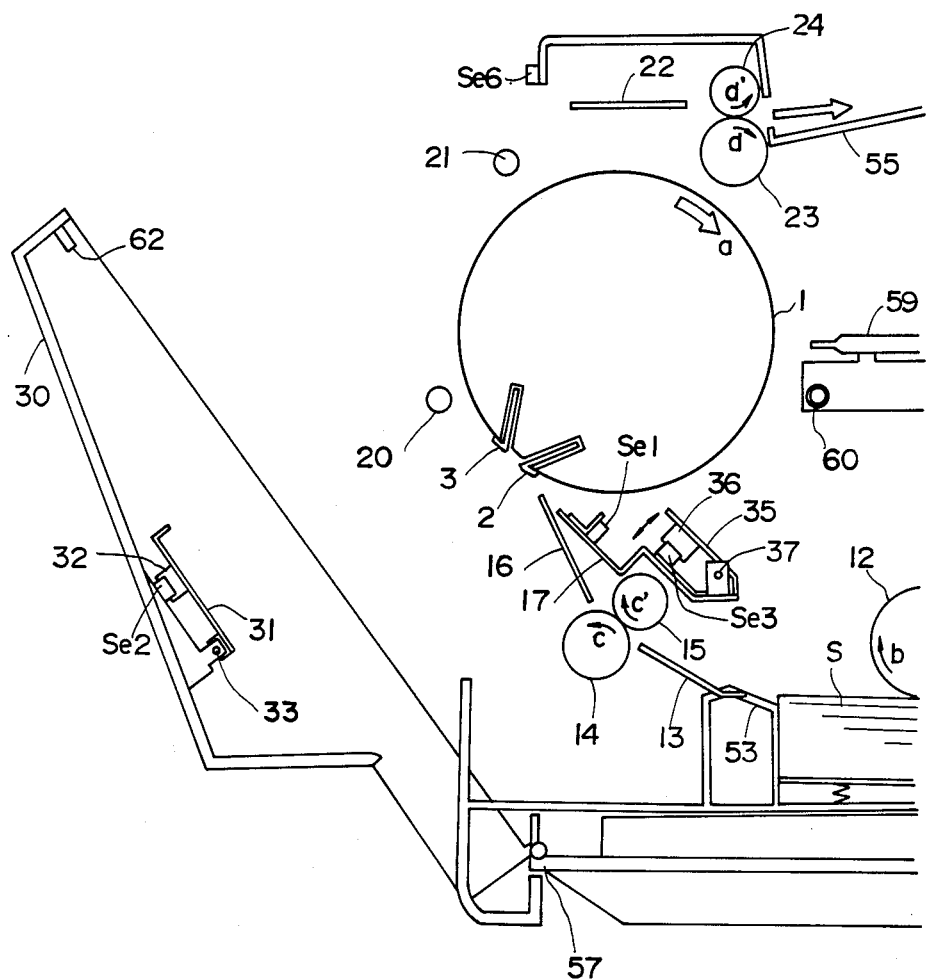
FIG. 2 shows the ink jet printer with a front cover released.
Figure 6:
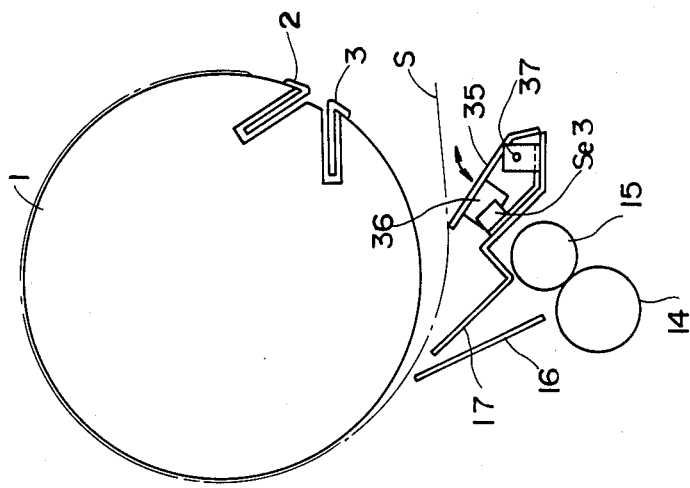

A front cover (30) of the unit is movably mounted on the housing and is openable and closeable in the direction (58) around a release axis (57) in the lower part of the unit so as to provide access into the printer for removing sheets incorrectly clamped in the vicinity of the drum (1). (see FIG. 2).

Description will now be made of the structure of the sheet winding detection mechanism.

A means for detecting an improperly clamped sheet of the winding drum by movement of the sheet away from the winding drum and into contact with the detecting means comprises an actuator member, such as a detection lever (31) behind the front cover (30) which is provided pivotably around a pin (33) such that, when the front cover (30) is closed as shown in FIG. 1, the lever (31) is movable towards and away from the drum and rotates in a clockwise direction under its own weight. This detection lever (31) has a curved portion (31a) at its tip which faces the drum (1), and a projecting piece (32) at the rear. A transmitting photosensor (Se 2) attached to the rear of the front cover (30) is thus switched ON and OFF by the projecting piece (32) according to the pivotal movement of the detection lever (31) from a detecting position spaced from the drum to an actuating position spaced further from the drum than the detecting position.

A second detection lever (35) pivotable about a pin (37) with a projecting piece (36) is provided on said guide plate (17) and urged in the clockwise direction by a spring means (not shown) such that the tip thereof is biased against the peripheral surface of the drum (1). A transmitting photosensor (Se 3) attached to guide plate (17) is so arranged to be switched ON and OFF by the pivoting of the detecting lever (35).

An actuator (62) for a safety switch (Se 6) is provided on the top end of the front cover (30). When the cover (30) is open, the safety switch (Se 6) is OFF, and the lever (31) rotates under its own weight in a counterclockwise direction. This in turn brings the sensor (Se 2) into an abnormal detecting condition (see FIG. 2) so that, even if the safety switch (Se 6) becomes turned on inadvertently when the front cover (30) is released, the drum (1) does not operate.

In the above construction, the drum (1) is in such a position that the front edge clamp (2) is opposed to the tips of guide plates (16) and (17) at the beginning of the winding operation. When the record paper (S) is supplied from the cassette (11), the front edge clamp (2) is first released from the surface of the drum (1), and when the edge of the paper (S) is detected by sensor (Se 1), the front edge clamp (2) closes after a certain time has elapsed. The edge of the paper (S) which has passed between the drum (1) and the front edge clamp (2), is thus clamped by the front edge clamp (2). At the same time, the drum (1) is started to rotate at a speed of 10-20 cm/sec in the direction (a), and the pressure roller (20) is pressed against the drum (1) with the paper (S) therebetween. In this way, the paper begins to be wound around drum (1).

Just before the drum has completed one revolution, it slows down to 2.5 cm/sec, and the rear edge clamp (3) is released. On performing one revolution, the rear edge of the paper (S) fed between the drum (1) and the rear edge clamp (3) is clamped by the closure of rear edge clamp (3) and the contact of pressure roller (20) is released. The paper (S) is then completely wound about and held on the surface of the drum (1). Subsequently the drum (1) rotates at a high speed of 500 cm/sec and, while the printing head (59) shifts and (not shown in the figure) executes the prescribed step to eject ink from the nozzle (59a) to the paper held on the surface of the drum (1), by which the prescribed recording is made on the paper (S).

After the printing operation has been completed, the drum (1) slows down to a rotational speed of 10-20 cm/sec, then to 2.5 cm/sec, and front edge clamp (2) is released so as to separate the paper (S) from the drum (1) on its own strength of stability. The separated paper (S) is sent on in a tangential direction, and then led to the paper discharging rollers (23), (24) by the paper discharging guide plate (22) so as to discharge the paper into the discharging tray (55). More specifically, at this time, separating roller (21) comes into contact with the drum (1). When the front edge of the paper (S) is separated, the front edge clamp (2) closes, and the speed of the drum is increased to 10-20 cm/sec, and then the rear edge clamp (3) is released. After the rear edge of the paper has separated, the rear edge clamp (3) is closed, however the drum (1) is continued to rotate so as to stop in the position indicated in FIG. 1 for the next recording.

The photosensor (Se 2) attached to the front cover (30) detects a clamp error when the front edge of the paper (S) has not been correctly clamped. More specifically, if the leading edge was not properly clamped by the clamp (2) because the paper has curled or more than one sheet was fed in at a time, the paper is carried forward by carrier rollers (14), (15) to strike the curved portion (31a) of the detection lever (31) over or below the pressure roller (20) as shown in FIG. 4. This causes the detection lever (31) to pivot in an counterclockwise direction around the pin (33), whereupon the projecting piece (32) obstructs the light path of photosensor (Se 2) which in turn emits a clamp error signal to stop the drum rotation.

Figure 5:
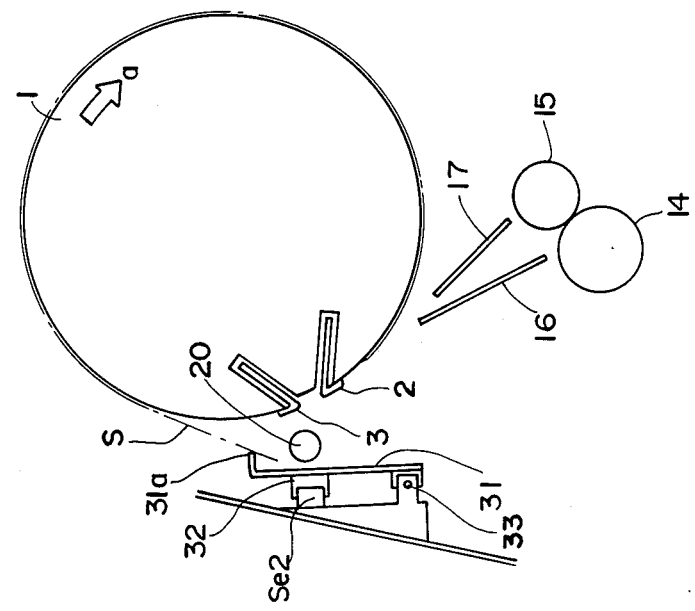

The photosensor (Se 2) also detects incorrect clamping of the rear edge of the paper (S). If the pressure roller (20) is separated from the drum (1) too early, the rear edge of the paper is not clamped by the rear edge clamp (3). The rear edge is swung outward under the centrifugal force due to the rotation of drum (1), and strikes the curved portion (31a) of detection lever (31) (see FIG. 5). This causes the detection lever (31) to pivot in a counterclockwise direction, which in turn causes the photosensor (Se 2) to emit a clamp error signal.

In addition, the photosensor (Se 3) attached to the guide plate (17) detects faulty clamping of the rear edge of the paper (S). If incorrect clamping of the rear edge occurs, the rear edge of the paper (S) swings outward under the centrifugal force of rotation of the drum (1), as described above, and strikes an edge of detection lever (35) facing the drum 1. This causes the detection lever (35) to pivot in a counterclockwise direction around pin (37). Following the rotation of the lever (35) the projecting piece (36) obstructs the light path of photosensor (Se 3), whereupon photosensor (Se 3) emits a clamp error signal to stop the drum rotation.

Also if, for some reason, a clamp error occurs during printing with the front or rear edge of the paper (S) leaving the surface of the drum (1), either detection lever (31) or (35) is pivoted by the paper, by which the clamp error is detected.

Figure 8:
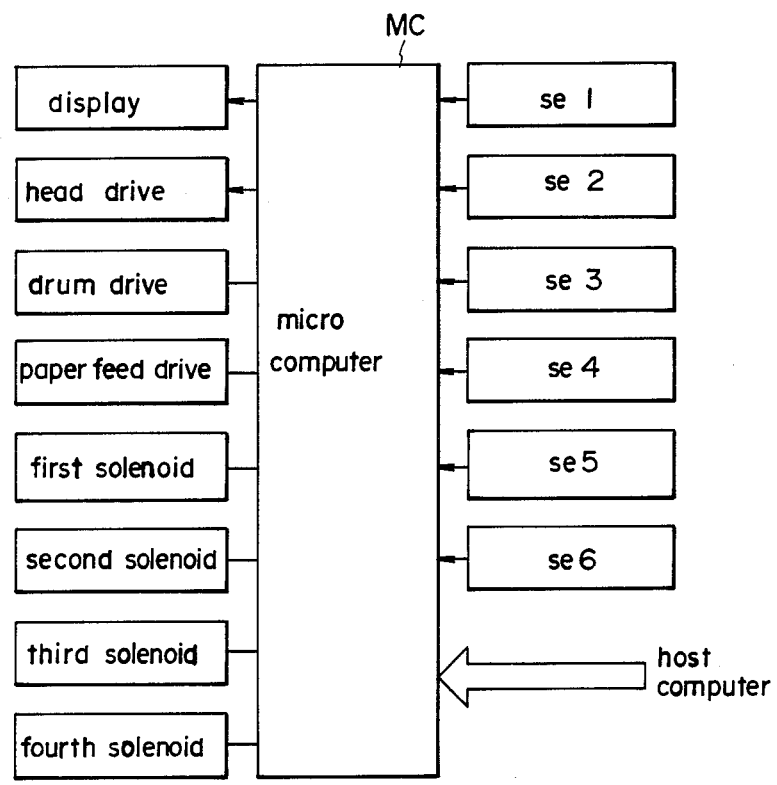
FIG. 8 is a diagram of the ink jet printer control circuit.

FIG. 7 shows the relationship between drum rotation speed and time whereas FIG. 8 is a schematic representation of a control circuit of the ink jet recorder. This control circuit is designed around a microcomputer (MC). Various sensors and switches (Se 1–Se 6), and image signals from a host computer or image readers are connected to input ports of the microcomputer (MC). On the other hand, various display devices to indicate the state of the apparatus, a drive mechanism of the head (59), a drive mechanism of the drum (1), a paper feed mechanism, and solenoids 1–4 are connected to output ports of the microcomputer (MC).

The microcomputer (MC) outputs signals from the output ports as a function of the signals input to the input ports, and controls all the various drive mechanisms. The control sequence for the above microcomputer (MC) is shown in detail on flowcharts 9–11.

Figure 9:
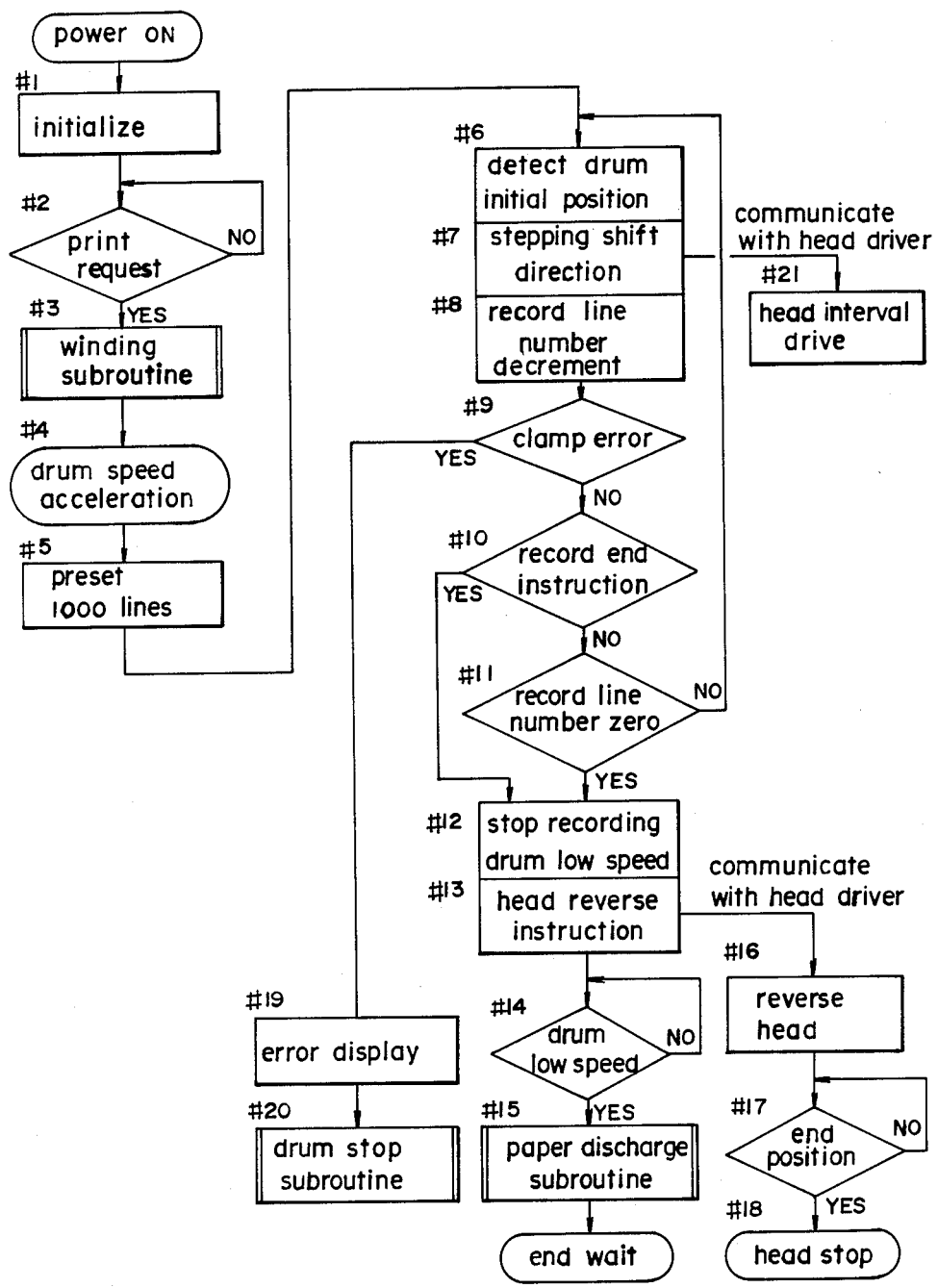
FIGS. 9-11 are flowcharts of the control sequence governing the ink jet printer.

FIG. 9 illustrates a main routine for the ink jet recorder. When power is switched ON in Step 1, the microcomputer (MC) is first initialized; in Step 2, the recorder waits for print instructions from the host computer; and in Step 3, the subroutine for winding the record paper (S) is executed. In Step 4, a subroutine to accelerate the drum is executed; and in Step 5, record lines is preset at 1000. In Step 6, a standby position for drum (1) is detected. The standby position for the drum as shown in FIG. 1, is detected by a pulse disk and sensor (neither of which are shown in the figs.), which are parallel to the axis of rotation (50). In Step 7, a drive mode of the pulse motor which moves the printing head (59) is instructed so as to move the head step by step at every 4 pulses. In Step 21, the pulse motor is supplied with 4 pulses intermittently, then in Step 8, the number of record lines is subtracted.

In Step 9, it is judged whether or not a clamp error has occurred. If the clamp error has occurred, an error message is displayed immediately in Step 19, and in Step 20, a subroutine to stop the drum (1) is executed, whereby the drum (1) and the printing head (59) stops rotating and recording, respectively.

If there is no clamp error, it is judged in Step 10 whether or not recording is finished. If it has not, it is judged in Step 11 whether or not the number of record lines is zero, and if it is not, control returns to Step 6 above. If the number of record lines is judged to be zero, the record command is given in Step 10, or if the number of record lines is zero in Step 11, recording operation is then terminated, and a command is given to slow down the drum (1) in Step 12. Successively in Step 13, a command is given to reverse the print head, which is transmitted to the head drive mechanism. In Step 16, the head is reversed with its speed adjusted. After waiting for the head to return to an end position in Step 17, the print head is stopped in Step 18. Meanwhile, after waiting for the drum (1) to slow down to low speed in Step 14, the paper discharge subroutine is executed in Step 15.

Figure 10:
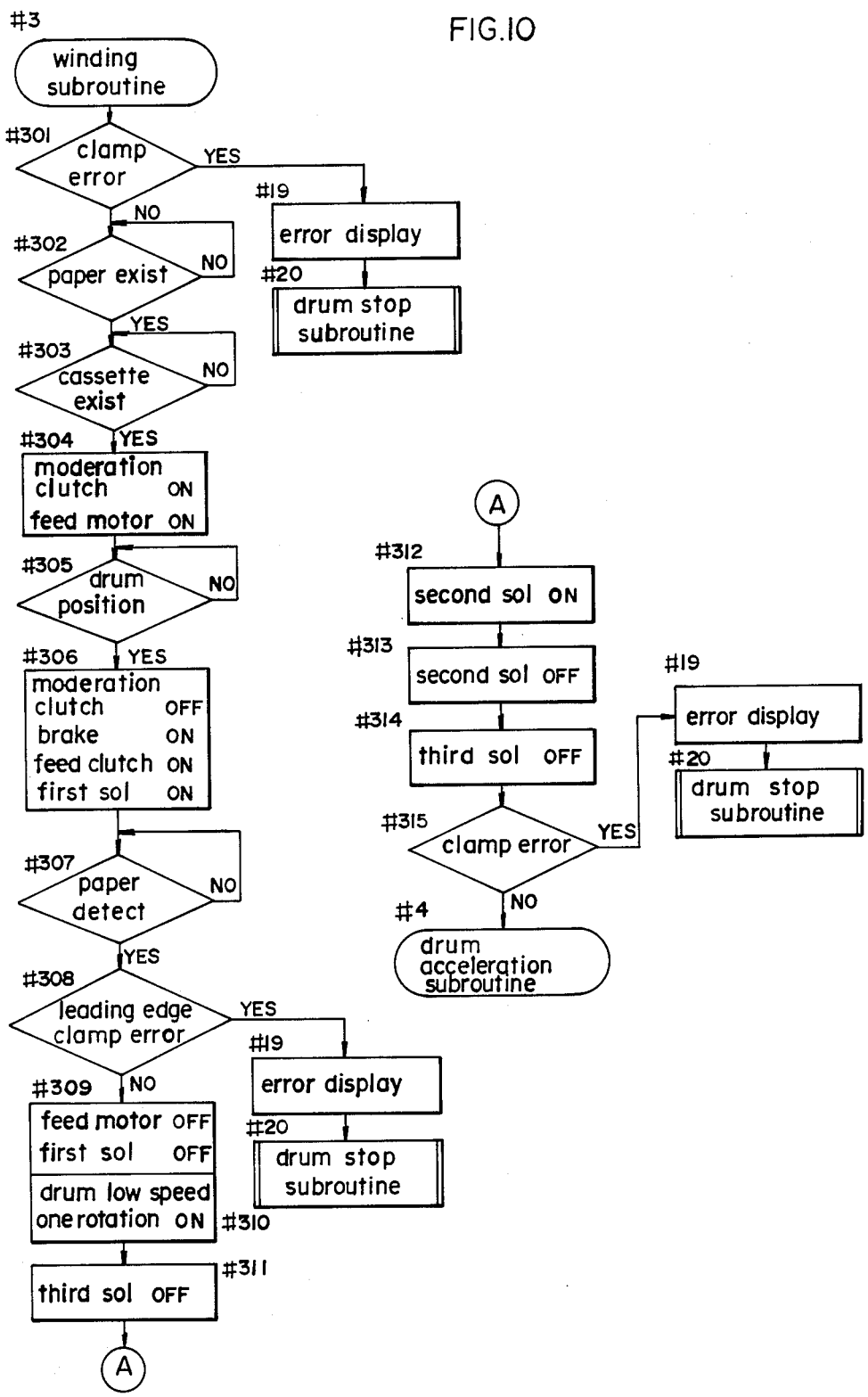

FIG. 10 illustrates the winding subroutine in Step 3. First, in Step 301, it is judged whether or not a clamp error has occurred. If the clamp error has occurred, an error message is displayed in Step 19, and the drum (1) is stopped in Step 20. If there is no clamp error, it is confirmed, in Steps 302 and 303, that sensor (Se 4) has detected the paper, and that sensor (Se 5) has detected that cassette (11) is in the prescribed position. Then, in Step 304, the moderation clutch is switched ON, and the paper feed motor is switched ON.

Next, in Step 305, it is confirmed that the drum (1) is in the standby position. In Step 306, the moderation clutch is switched OFF, the brake is switched ON, the paper feed clutch is switched ON, and under such conditions record paper (S) is fed from cassette (11). At the same time, the first solenoid is switched ON so as to release the front edge clamp (2). After the sensor (Se 1) detects that the front edge of the paper (S) has reached drum (1) in Step 307 it is judged whether or not the front edge of the paper (S) has been correctly clamped in Step 308. If the front edge has not been correctly clamped, the error message is displayed immediately in Step 19, and the drum (1) is stopped in Step 20. If there is no clamp error, the front edge clamp (2) is closed to clamp the paper by switching OFF the first solenoid and the paper feed motor in Step 309. At the same time, in Step 310, the drum (1) is rotated at low speed. In Step 311, the third solenoid is switched ON so as to contact the pressure roller (20) with the drum (1).

Next, in Step 312, the second solenoid is switched ON so as to release the rear edge clamp (3). In Step 313, the second solenoid is switched OFF so as to clamp the rear edge of the paper (S) by the rear edge clamp (3). In Step 314, the third solenoid is switched OFF so as to bring the pressure roller (20) away from the drum (1). At this time, in Step 315, it is judged whether or not the paper (S) has been clamped correctly. If the clamp error has occurred, the error message is displayed immediately in Step 19, and the drum (1) is stopped in Step 20. If there is no clamp error, control moves to Step 4, wherein the drum acceleration subroutine is executed.

Figure 11:
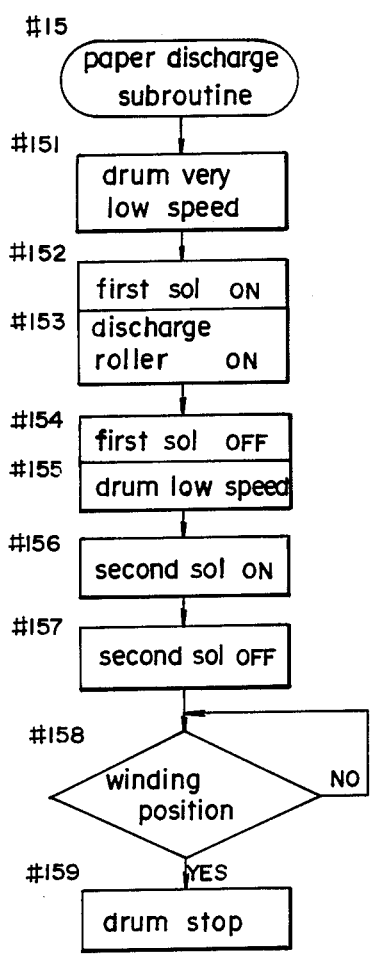

FIG. 11 illustrates the paper discharge subroutine in Step 15. First, in Step 151, the drum (1) is slowed down to a very low speed. In Step 152, the first solenoid is switched ON so as to separate the front edge of the sheet from the drum by releasing the front edge clamp (2). At the same time, in Step 153, the paper discharge rollers (23), (24) are rotated, following which, in Step 154, the first solenoid is switched OFF so as to close the front edge clamp (2). In Step 155, the drum (1) is returned to low speed; and in Step 156, the second solenoid is switched ON so as to separate the rear edge of the paper from the drum (1) by releasing the rear edge clamp (3). Following this, in Step 157, the second solenoid is switched OFF to close the rear edge clamp (3). By those operations mentioned above the record paper (S) is discharged from the paper discharge rollers (23), (24). Next, in Step 158, it is confirmed that drum (1) has reached the winding position, and in Step 159, drum (1) is stopped.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein. For example, the photosensors (Se 2) and (Se 3) which detect clamp error can be replaced by microswitches. Also, the form of the detection levers (31) and (35) can be modified in various ways.

What is claimed is:

1. A sheet winding apparatus with a detection mechanism for detecting incorrect winding of a sheet, said sheet winding apparatus comprising;
   a housing;
   a winding drum disposed in said housing and having a first clamp member for clamping the front edge of the sheet and a second clamp member for clamping the rear edge of the sheet;
   a drum driving means for driving said winding drum at a predetermined speed;

a sheet feed means for feeding the sheet toward said first clamp member;

a clamp driving means for driving said first and second clamp members so as to clamp the front and rear edges of the sheet fed by said sheet feed means;

a cover member movably mounted on said housing for access to said winding drum by opening of said cover member;

means for detecting improper clamping of the sheet on said winding drum by movement of the sheet away from said winding drum and into contact with said detecting means comprising an actuator member movably provided at the inside of said cover member, said actuator member being movable by an advancing sheet whose front edge is not correctly clamped by said first clamp member and by opening of said cover member;

a sensing means for sensing the movement of said actuator member and outputting a signal; and a stop means for stopping the rotation of said winding drum when said signal is output from said sensing means.

2. A sheet winding apparatus as claimed in claim 1, wherein said actuator is movable by a sheet whose rear edge is not correctly clamped by said second clamp member.

3. A sheet winding apparatus as claimed in claim 1, wherein said actuator member is movable from a stationary detecting position spaced from said winding drum to an actuating position spaced further from said winding drum than said detecting position.

* * * * *